May 22, 1928.
L. C. GUNDERMAN
1,670,933
PEDAL CONTROL ATTACHMENT FOR AUTOMOBILES
Original Filed Dec. 15, 1926
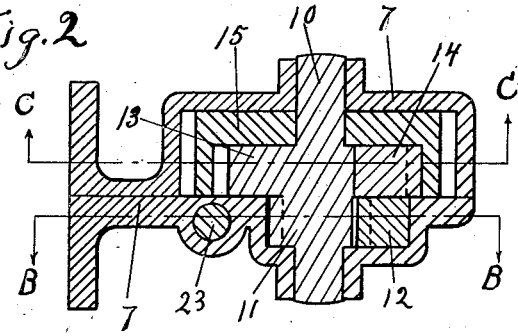
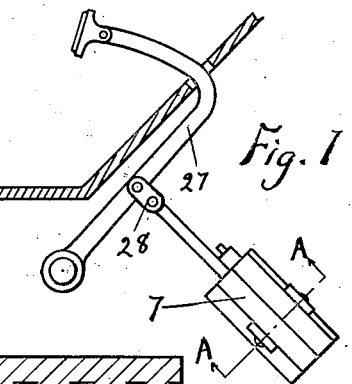
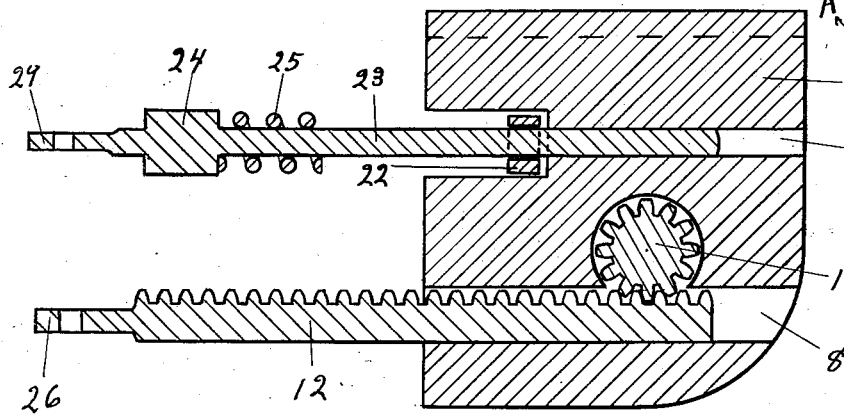
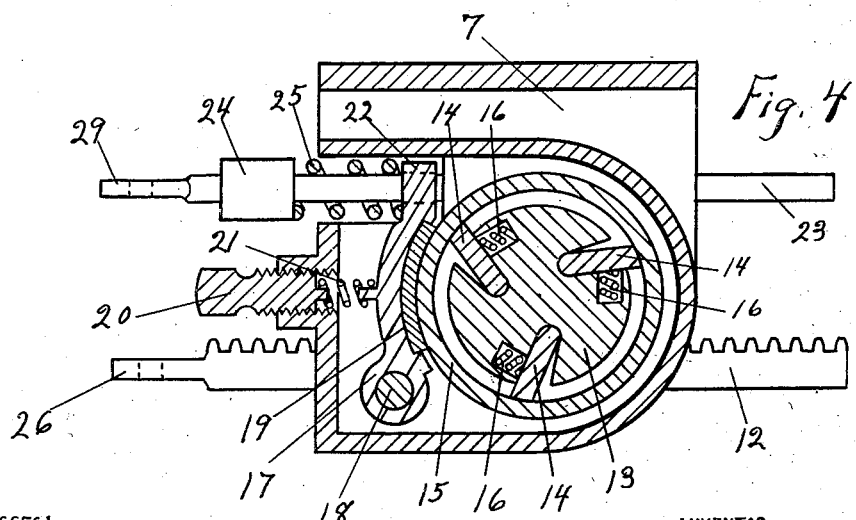
WITNESSES;
INVENTOR.
Lester C. Gunderman Patented May 22, 1928.

1,670,933

UNITED STATES PATENT OFFICE.

LESTER C. GUNDERMAN, OF PITTSBURGH, PENNSYLVANIA.

PEDAL-CONTROL ATTACHMENT FOR AUTOMOBILES.

Application filed December 15, 1926, Serial No. 154,898. Renewed March 27, 1928.

This invention is an attachment for automobiles and comprises a device adapted to be connected to the clutch and brake pedals for controlling the movement of one pedal, to a certain extent, with respect to movement of the other pedal.

In an automobile it is customary to have the clutch and brake pedals arranged one beside the other, and in use the brake is often operated without operating the clutch, and vice versa. However, in coming to a stop both pedals are usually operated simultaneously, and if the car is stopped in this manner going up a grade, the releasing of the brakes to use the feet to operate both the clutch and accelerator will leave the car free to roll back, unless the emergency brake is used, or the engine accelerated by the hand control, while one foot is kept on the brake and the other on the clutch pedal.

An object of the present invention is to provide a device which will not interfere with the independent operation of the foot pedals when desired, so that it affords no impediment to driving, but when both are depressed for stopping the car and then released the device will function in such a way that the brake is gradually released automatically as the clutch is being gradually brought into operative position, whereby the operator is free to use the foot removed from the brake pedal to operate the accelerator and the car can be smoothly started without jerking.

These and other objects which will be apparent to those skilled in this particular art are attained by means of the invention illustrated in the accompanying drawing, in which Figure 1 is a side view showing diagrammatically the attachment together with the relation to the brake and clutch pedals. Fig. 2 is a transverse section in the plane of line 2—2 of Fig. 1. Figure 3 is a longitudinal section through the attachment in the plane of line 3—3 of Fig. 2. Figure 4 is a longitudinal section through the attachment in the plane of line 4—4 of Fig. 2.

The several parts of the device are carried by a casing 7, which is preferably in two parts, one provided with parallel guideways 8 and 9 extending therethrough, and journalled in the casing is a transverse shaft 10 having gearwheel 11 in mesh with a rack 12 that slides freely in the guideway 8. The shaft is enlarged in the form of a clutch member 13 recessed tangentially to receive spring actuated pawls 14 which engage the inner side of the rim of a brake drum or companion clutch member 15, and these pawls are actuated against the rim of the drum by springs 16 which yield to permit the shaft and gearwheel to be freely rotated in one direction, but when the motion of said gearwheel and shaft is reversed, in the operation of the device as hereinafter described, the pawls are pressed against the rim of the drum and lock the clutch members together so that the movement of the rack is controlled by the clutch and consequently motion of the parts may be regulated or retarded by braking means applied to the drum, as for instance the friction brake or lever 17, which is pivoted at one end in the casing, at 18, with its other or free end 22 extended to align with the guideway 9 and apertured for the passage of a plunger-rod 23 therethrough slidable in said guideway. The brake-lever is provided with a renewable shoe 19 adapted to impinge on the drum, and is normally pressed against said drum by a spring 21 interposed between the lever and an adjusting screw 20, the latter being threaded into the casing, as shown in Fig. 4.

By setting the screw 20 the friction on the drum 15 will be increased retarding the rotation of said drum and by turning the screw out the degree of friction may be lessened.

The plunger has a collar 24 near its outer end and a short spring 25 is located on the plunger between the collar and outer end of the brake-lever to be compressed when the foot-lever or clutch pedal is pushed all the way in to cushion the thrust against the brake-lever. The collar may be adjustable on the plunger but I have shown it as an integral part thereof.

The rack 12 is reduced at its outer end 26 and provided with an aperture for connecting it with the brake pedal 27 by a connecting link 28, and in like manner the reduced outer end 29 of the plunger 23 is connected to the clutch pedal (not shown).

In operating it will be seen that on depressing the clutch pedal the plunger 23 will be forced in, and as this movement of the plunger is unobstructed the clutch can be operated freely at all times. When the clutch pedal is in released position, with the driving clutch of the automobile in gear, the collar on the plunger 23 is away from the brake lever 17 and consequently the brake-pedal 27 connected to rack 12 can be operated freely inasmuch as the shaft and parts carried thereby are free to be rotated, but the outward movement of the brake pedal and rack is retarded by the pressure of the brake-lever 17 on the drum under the influence of the expansion spring to provide a gradual releasing of the automobile brakes automatically by the friction brake of the device, and of course the action of this friction brake can be varied by adjusting screw 20.

If however the clutch and the brake pedals are depressed simultaneously the plunger 23 will force the spring 25 against the brake lever 17 putting sufficient force thereon to prevent the friction clutch device and shaft 10 from rotating, and consequently the brake pedal cannot return to its normal position, as long as the clutch pedal is depressed. Therefore the operator may remove his foot from the brake pedal if so desired at such a time. When the operator gradually releases the clutch pedal the extra holding pressure on the brake lever 17 is immediately released allowing the friction clutch device to revolve carrying along with it the gear shaft 10 and gearwheel 11, but as the clutch device is automatically retarded by the brake-lever and cooperating spring 21 the brake pedal will move slowly back to normal position thus gradually releasing the brake pedal as the clutch pedal is operated.

The advantage of the invention arises from the provision of means for gradually letting off the brake automatically when the foot is removed from the brake pedal and the car is standing still, so that starting on a hill or in a congested street is very easily accomplished without the annoyance of using the emergency brake.

Another advantage of the invention resides in the provision of an attachment which will permit of such operation of the brake without interfering with the independent operation of either pedal.

The device can be cheaply manufactured and easily installed at any suitable location on the car frame with respect to the foot pedals for operating the brake and clutch depending upon the type of car.

I do not wish to be understood as having limited myself to the exact detail of construction shown and described, but desire to have it understood that the invention I have shown in the drawing is merely illustrative, as it is manifest that various minor changes may be made in the form, shape and particular arrangements of the parts without departing from the spirit of my invention, hence, I reserve the right to make any such changes, or modifications as may fairly fall within the scope of the appending claims when fairly construed.

What I claim is:

1. The combination with the brake and clutch pedals of an automobile, of a friction brake comprising a shaft connected to the brake pedal, a friction drum and a companion member on said shaft, and means connected to the clutch pedal for controlling the operation of said friction brake.

2. The combination with the clutch and brake pedals of an automobile of a friction brake controlled by the clutch pedal, and means responsive to the frictional brake for controlling the operation of the brake pedal.

3. The combination with the brake and clutch pedals of an automobile, of a friction device for controlling the operation of one of the pedals comprising a brake-controlled drum, a rack and pinion connecting the drum to the brake pedal, a plunger connected to the clutch pedal, and means operated by the plunger controlling the operation of the drum.

4. The combination with the brake and clutch pedals of an automobile, of a casing having a rack slidable therein and connected to one of the pedals, a shaft having a pinion in mesh with said rack, a drum on said shaft, a plunger connected to the other pedal and operated thereby, and means frictionally engaging the drum and controlled by the plunger.

5. The combination with the brake and clutch pedals of an automobile of an attachment therefor comprising a friction drum, a shaft carrying the drum, a pinion fixed to said shaft, a brake lever cooperating with the drum and connected to the clutch pedal, means for adjustably controlling the frictional contact of the brake lever with the drum, and a rack in mesh with said pinion on the shaft and connected to the brake pedal.

6. The combination with the brake and clutch pedals of an automobile of an attachment therefor comprising a friction drum and pawls cooperating therewith, a shaft carrying the pawls and on which the drum is mounted, means connecting the shaft to the brake pedal, a brake lever connected to the clutch pedal and cooperating with the friction drum, and means operating independently of the clutch pedal for yieldingly applying the brake lever.

7. In combination with the brake and clutch pedals of an automobile of an attachment therefor comprising a casing having a shaft journaled therein, a drum loosely mounted on said shaft, pawls carried by the shaft to engage the drum for turning the latter in one direction, a brake lever engaging the drum and pivotally mounted in the casing at one end, a plunger slidable in the casing and connected to the clutch pedal and to the outer end of the brake lever, and a spring engaging the brake lever for pressing it yieldingly against the drum; together with a rack slidable in the casing and connected to the brake pedal, and a pinion on the shaft in mesh with said rack.

8. In combination with the brake and clutch pedals of an automobile of an attachment therefor comprising a casing having a shaft journalled therein, a drum loosely mounted on the shaft and having a projecting rim, spring-actuated pawls carried by the shaft and engaging the inner side of the rim of the drum for locking said drum to the shaft when the latter is turned in one direction, means connecting the shaft to the brake pedal, and a brake lever pivoted at one end in the casing and spring-actuated against the drum; together with a plunger slidable in the casing and through the outer end of the brake lever, a collar on the plunger, and a cushioning spring interposed between the collar and brake lever, said plunger being connected to the clutch pedal.

In testimony whereof I have affixed signature.

LESTER C. GUNDERMAN.